2,930,675
PREPARATION OF MAGNESIUM BOROHYDRIDE

Howard Dean Batha, Tonawanda, and Herman B. Urbach, Niagara Falls, N.Y., assignors to Olin Mathieson Chemical Corporation, a corporation of Virginia No Drawing. Application November 15, 1957
Serial No. 696,883

4 Claims. (Cl. 23—14)

This invention relates to a method for the preparation of magnesium borohydride. More particularly, it relates to the formation of magnesium borohydride by the reaction of magnesium hydride with diborane.

The alkaline earth metal borohydrides, such as magnesium borohydride, are well known and are very useful compounds. They are active reducing agents, and are an advantageous source of diborane. They have been produced in a variety of ways, but all of these are subject to one or more defects. It has been proposed to prepare magnesium borohydride by the reaction of diethylmagnesium with diborane in the presence of benzene. This reaction, however, requires excess diborane to avoid the formation of magnesium hydride. Magnesium borohydride has been prepared by Wiberg and Bauer, (Z. Naturforschg., 5b, 397 (1950)) by the reaction in diethyl ether solution of a magnesium dialkyl and diborane at room temperature according to the following equation:

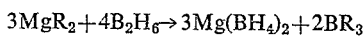

The presence of the diethyl ether solvent appears to be necessary if good yields are to be obtained in the reaction. The use of diethyl ether as the solvent for this reaction, however, prohibits a large scale economical and safe method of making magnesium borohydride.

In accordane with the present invention, it has been discovered that magnesium borohydride can be prepared in good yield by reacting magnesium hydride and diborane while the magnesium hydride is in admixture with a lower dialkyl ether of ethylene glycol, a lower dialkyl ether of a polyethylene glycol, a mixture of these materials or a mixture of benzene with one or a mixture of these materials. The reaction between the magnesium hydride and the diborane while the magnesium hydride is in admixture with the dialkyl ether appears to proceed according to the following equation:

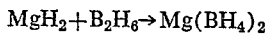

The dialkyl ethers which are employed as a reaction medium in accordance with the present invention are those of the class $RO(CH_2CH_2O)_nR'$ wherein R and R' are alkyl radicals containing from 1 to 4 carbon atoms and $n$ is an integer from 1 to 4. Among the suitable dialkyl ethers which can be used are ethylene glycol diethyl ether, ethylene glycol dimethyl ether, ethylene glycol di-n-butyl ether, diethylene glycol dimethylether, diethylene glycol diethyl ether, triethylene glycol dimethyl ether, triethylene glycol di-n-butyl ether, tetraethylene glycol dimethyl ether, tetraethylene glycol diethyl ether and the like. The reaction is generally conducted at a temperature within the range of 25° to 105° C., although somewhat higher and somewhat lower temperatures can also be utilized, if desired. In carrying out this reaction, the reaction medium will generally contain from about one to about 10 percent by weight of magnesium hydride, based upon the weight of the dialkyl ether.

The following examples illustrate this invention. In the examples the term "moles" signifies gram moles.

EXAMPLE I

An experiment was conducted in a 250 ml. round bottom three-neck flask, fitted with a thermowell. The flask was attached to a gas inlet tube which extended below the surface of the reaction medium, and a water cooled condenser which was connected to a high vacuum system through a trap cooled to —78° C. by immersion in a Dry Ice acetone mixture. A second outlet tube was directly connected to the high vacuum system. Agitation of the reactants was accomplished by a magnetic stirrer.

The reaction flask was evacuated and flushed with nitrogen before the addition of the reactants. The flask was charged with approximately 80 ml. of the dimethyl-ether of diethyleneglycol and 0.0276 mole of magnesium hydride was added. The mixture was stirred and gradually warmed to 80° C., during which time the apparatus was flushed with nitrogen. After the nitrogen flush was terminated, 0.0301 mole of diborane at the rate of 0.3 ml. per min. was added. During this addition the temperature was maintained at 80° to 82° C. After the diborane had been completely added, the nitrogen flush was resumed and the mixture was allowed to cool to room temperature. This mixture then was filtered in a nitrogen atmosphere through a sintered glass disc.

The residue remaining on the sintered disc was dried at approximately 80° C. while under a vacuum of approximately one to five ml. of mercury. The dried residue contained 0.0293 mole of magnesium and 0.0539 mole of boron. This corresponds to 0.02695 mole of magnesium borohydride for a 97.4 percent yield.

Examples I, II and III, conducted in the same manner at different temperatures, are summarized in Table I.

EXAMPLE IV

This example was conducted similarly to Example I, using as the reaction medium 90 cc. of tetraethylene glycol dimethyl ether. The magnesium, 0.0539 mole, charged to the reactor was admixed with the tetraethyleneglycol dimethyl ether. Diborane, 0.0452 mole, at the rate of 0.3 ml. per minute was passed into the stirred mixture while the temperature was maintained at 25° to 35° C. In this manner, an 80.3 percent yield of magnesium borohydride was obtained.

Examples IV, V and VI, performed in the same reaction medium at various temperatures, are summarized in Table I.

EXAMPLE VII

This example was conducted similarly to Example I, but using approximately 90 cc. of a 3 to 1 by volume mixture of diethylene glycol dimethyl ether and benzene as the reaction medium. Magnesium hydride, 0.0480 mole, was added to the mixed solvent. Then diborane, at the rate of 0.6 ml. per min., was passed into the mixture while the temperature was maintained at 80° to 89° C. In this manner, there was produced a 97.5 percent yield of magnesium borohydride.

This example, as well as Examples VIII, IX and X, is summarized in Table I.

The amount of solvent used in the various experiments was approximately 80 to 100 ml. An experiment conducted using benzene alone as a solvent as well as a mixture of one volume dimethyl ether of diethylene glycol and 2.5 volumes benzene as the reaction medium were both unsuccessful in the preparation of magnesium borohydride. The use of isopropylether as the liquid medium for this reaction also was unsuccessful for the production of magnesium borohydride.

Table 1

$MgH_2 + B_2H_6 \rightarrow Mg(BH_4)_2$

| Example | Solvent | Temp. | MgH$_2$, Moles | B$_2$H$_6$, Moles | B$_2$H$_6$ Rate, ml./min. | Mg(BH$_4$)$_2$ Percent Yield |
|---|---|---|---|---|---|---|
| I | Diethylene glycol dimethyl ether. | 80–82 | 0.0276 | 0.0301 | 0.3 | 97.4 |
| II | ----do---- | 71–77 | 0.0414 | 0.0244 | 0.2 | 72.4 |
| III | ----do---- | 25–35 | 0.0872 | 0.0235 | 0.4 | 94.6 |
| IV | Tetraethylene glycol dimethyl ether. | 25–35 | 0.0539 | 0.0452 | 0.3 | 80.3 |
| V | ----do---- | 81–84 | 0.0577 | 0.0487 | 0.49 | 71.5 |
| VI | ----do---- | 99–103 | 0.0362 | 0.0285 | 0.41 | 74.8 |
| VII | Diethylene glycol dimethyl ether–C$_6$H$_6$ 3:1. | 80–89 | 0.0480 | 0.0605 | 0.6 | 97.5 |
| VIII | ----do---- | 80–89 | 0.0454 | 0.0285 | 0.5 | 93.6 |
| IX | ----do---- | 80–87 | 0.0542 | 0.0933 | 0.8 | 103.2 |
| X | Diethylene glycol dimethyl ether–C$_6$H$_6$ 1:1. | 80–83 | 0.0241 | 0.0342 | 0.5 | 94.1 |

We claim:

1. A method for the preparation of magnesium borohydride which comprises reacting magnesium hydride and diborane at a temperature within the range of 25° to 105° C. while the reactants are admixed with a material selected from the class consisting of at least one compound of the generic formula $RO(CH_2CH_2O)_nR'$, wherein R and R' are alkyl radicals containing from 1 to 4 carbon atoms and $n$ is an integer from 1 to 4, and mixtures of such a compound with benzene in which the benzene represents up to 60% by volume of the mixture, and recovering magnesium borohydride from the reaction mixture.

2. The method of claim 1 wherein said material is diethylene glycol dimethyl ether.

3. The method of claim 1 wherein said material is tetraethylene glycol dimethyl ether.

4. The method of claim 1 wherein said material is a mixture of 50 to 75% by volume of diethylene glycol dimethyl ether and 25 to 50% by volume of benzene.

References Cited in the file of this patent

UNITED STATES PATENTS

| 2,545,633 | Schlesinger | Mar. 20, 1951 |
| 2,726,926 | Paul | Dec. 13, 1955 |
| 2,729,540 | Fisher | Jan. 3, 1956 |

OTHER REFERENCES

Schechter et al.: "Boron Hydrides and Related Compounds," page 52, Jan. 8, 1951, declassified Jan. 5, 1954, Bureau of Aeronautics, Dept. of Navy.

Wiberg et al.: "Chem. Abstracts," vol. 49, column 14548, Nov. 10, 1955; article abstracted is by Wiberg et al. from "Z. Naturforsch.," vol. 10b, pages 292–296 (1955).